Patented Jan. 6, 1925.

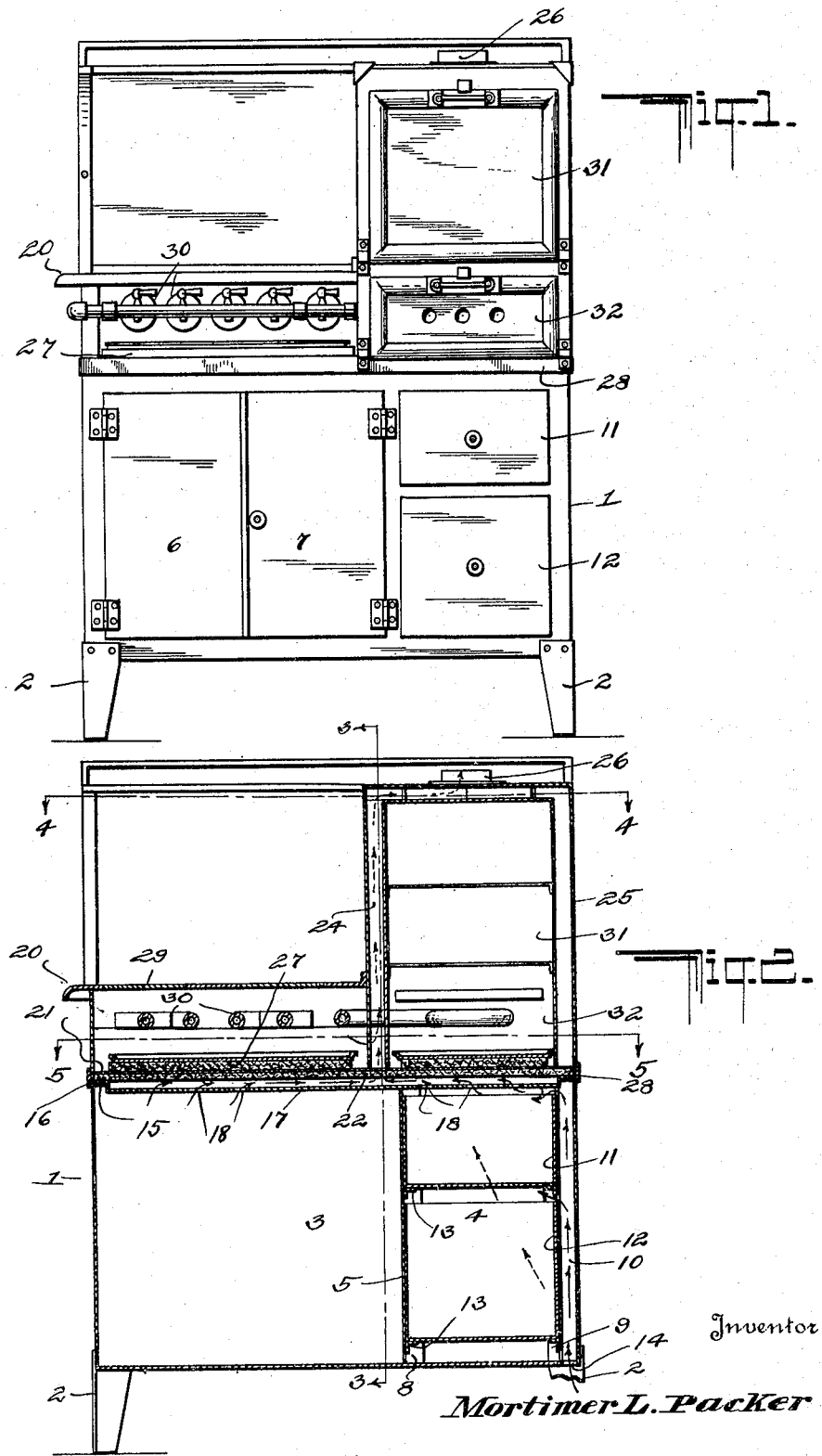

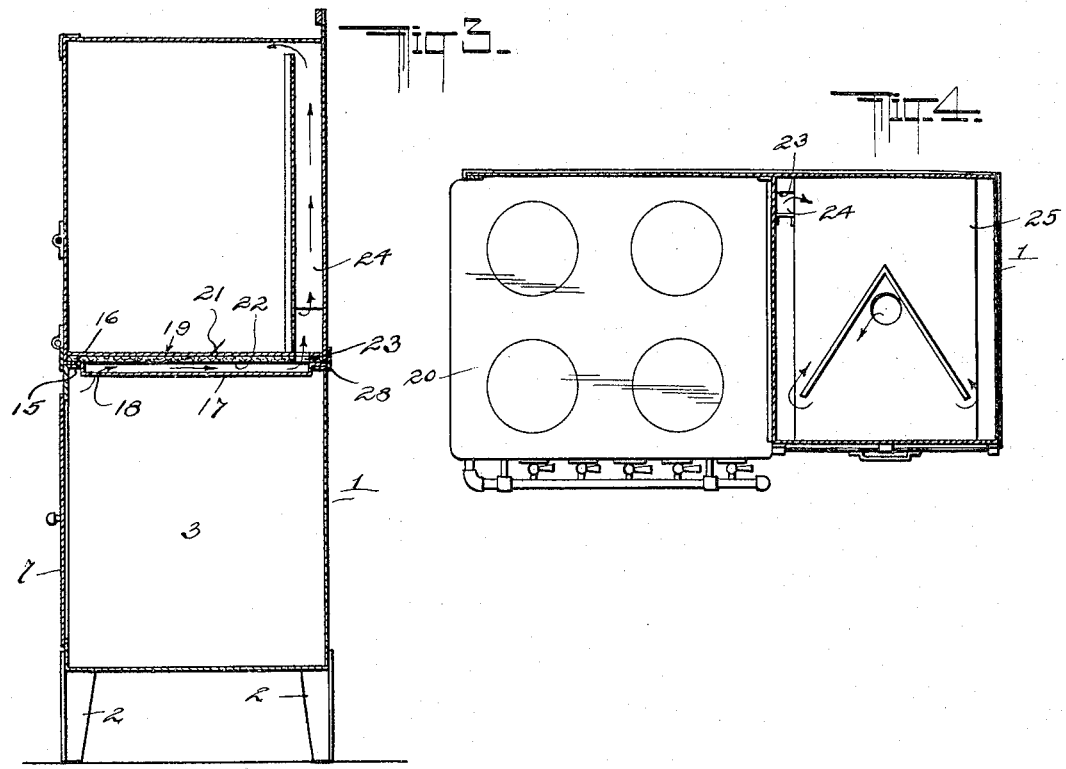
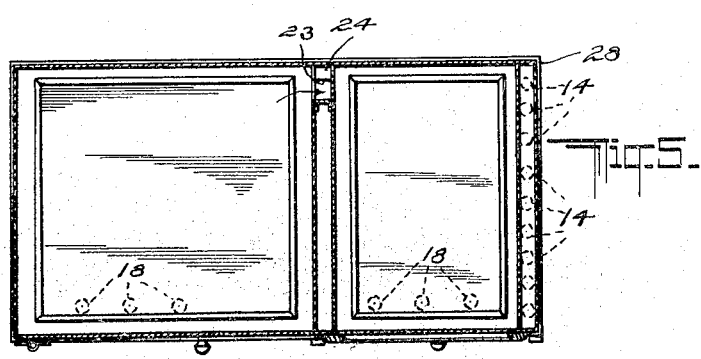

1,521,832

UNITED STATES PATENT OFFICE.

MORTIMER L. PACKER, OF COLUMBUS, OHIO.

COMBINED KITCHEN CABINET AND RANGE.

Application filed May 5, 1924. Serial No. 710,986.

*To all whom it may concern:*

Be it known that I, MORTIMER L. PACKER, a citizen of the United States, residing at Columbus, in the county of Franklin and State of Ohio, have invented certain new and useful Improvements in Combined Kitchen Cabinets and Ranges, of which the following is a specification.

My invention relates to a combined kitchen cabinet and range.

The present day tendency in the construction of homes and apartments is to conserve kitchen space and minimize the necessary steps of the housewife.

An object of my invention is to combine two modern essentials, the kitchen cabinet and the kitchen range, into a single piece of kitchen furniture, thereby utilizing the heretofore wasted space beneath the range by combining with it a well arranged cabinet base.

A further object of my invention is the provision of a combined kitchen cabinet and range in which the heated air currents of the range function to assist in cooling the compartments of the cabinet.

With these and other objects in view, as will appear as the description proceeds, the invention consists in the novel features of construction, combinations of elements and arrangements of parts hereinafter to be fully described and claimed.

In the accompanying drawing:

Figure 1 is a front elevation of my combined kitchen cabinet and range,

Figure 2 is a vertical sectional view through the complete structure,

Figure 3 is a transverse vertical sectional view taken on the line 3—3 of Figure 2, Figure 4 is a horizontal sectional view taken on the line 4—4 of Figure 2, and Figure 5 is a similar view taken on the line 5—5 of Figure 2.

Referring in detail to the drawing in which similar reference characters designate similar parts throughout the several views, reference character 1 designates the cabinet supported on the customary legs 2 and divided into two main compartments 3 and 4 by a vertical partition 5.

The compartment 3 may be further divided by shelves if so desired and is provided with doors 6 and 7 hinged at opposite sides of the front of the compartment 3, conventional latching means being provided to secure their free ends to the cabinet 1.

The compartment 4 is provided with vertically arranged members 8 and 9, the member 9 being slightly spaced from the outer wall of the cabinet 1 to provide an air space 10 therebetween. Drawers 11 and 12 in the compartment 4 are supported one above the other on angle bars 13 secured to members 8 and 9.

The doors 6 and 7 and drawers 11 and 12 are so arranged that their outer surfaces will be flush with the outer surface of the cabinet 1 when closed.

The openings 14 permit the entrance of air into the space 10 of the cabinet 1. An inturned flange 15 is provided at the top of the cabinet 1 and the flanges 16 of the pan shaped member 17 rest thereon. The openings 18 in the member 17 permit the passage of air from the cabinet 1 into said member 17. The bottom 19 of the range 20 comprises a sheet of metal 21 and a comparatively thick sheet or layer 22 of heat insulating material.

An opening 23 through the rear portion of the bottom 19 serves to conduct the air from the member 17 into the flue 24 provided in the double wall structure of the oven 25 and the flue 24 opens into the chimney 26.

Additional removable heat insulating pads 27 are provided on the bottom of the range 20 to further prevent the transfer of heat from the range to the cabinet.

The band 28 is secured to the bottom periphery of the range 20 and extends downwardly over the sides of the cabinet 1. The range 20, except as herein described, is of the usual construction, including the frame 29, burners 30, baking oven 31 and broiling oven 32.

At all times air circulates through the combined range and cabinet, entering through openings 14 passing through the cabinet 1 into the pan shaped member 17 and through the range 20 to the flue 26.

When the burners 30 are in use the insulating members 22 and 27 prevent the heat from the range 20 passing into the cabinet 1 and the air in the flue 24 becomes heated, and rising draws the air through the cabinet 1 much faster, thus tending to maintain the cabinet 1 cool under all conditions.

What is claimed is:

1. A combination kitchen range comprising a cabinet section and a superposed range section, said cabinet section including a plurality of compartments having openings in the top thereof and means permitting of air flow vertically therethrough, said range section including a burner compartment, heat insulating means between said burner compartment and said cabinet section, and an outlet flue formed through the top of the cabinet section and the bottom of the burner compartment and establishing direct connection therebetween.

2. An article of manufacture comprising a cabinet, a range associated therewith, an apertured pan member resting on said cabinet, the range bottom comprising a metal sheet and a heat insulating sheet resting on said member, an aperture in said bottom, a flue in said range over said aperture and apertures in the bottom of said cabinet.

3. A combination kitchen range comprising a base having a plurality of compartments formed therein, said compartments having openings provided therein contiguous to the upper portions thereof and means admitting of air circulation therethrough, a range section mounted on said base and comprising a burner containing compartment, a wall of heat insulating material separating said burner compartment from said base, and an outlet flue provided in said range section and disposed to communicate with said burner compartment and with the upper portions of the compartments provided in said base.

4. In a combination kitchen range, a base formed to comprise a storage compartment, said compartment having openings adjacent the top thereof and means admitting of air circulation therethrough, a range on said base, a wall of heat insulating material separating said range from said base, said wall of heat insulating material being spaced from the top wall of said base to provide an intervening air circulating chamber, a burner containing compartment provided in said range and an outlet flue having the lower portion thereof in communication with said burner compartment and with said air circulating chamber.

5. In a stove, an enclosed base comprising a storage compartment, said compartment having openings adjacent the top thereof and means to admit of air circulation therethrough, a range on said base, a wall of heat insulating material between said base and said range, the top wall of said base being spaced from said heat insulating wall to provide an air circulating chamber disposed to communicate with vent openings provided in the top wall of said compartment, a burner containing compartment provided in said range, an oven compartment contained in said range, and an outlet flue formed between the walls of the burner compartment and the oven compartment, said flue having the lower portion thereof in communication with said chamber and said burner compartment, whereby the heat issuing from the burner compartment and escaping through said flue serves to induce air circulation through said base compartment.

In testimony whereof I affix my signature.

MORTIMER L. PACKER.